Aug. 22, 1944.　　　　A. L. BLOUNT　　　　2,356,374
ALKYLATION
Filed June 20, 1939
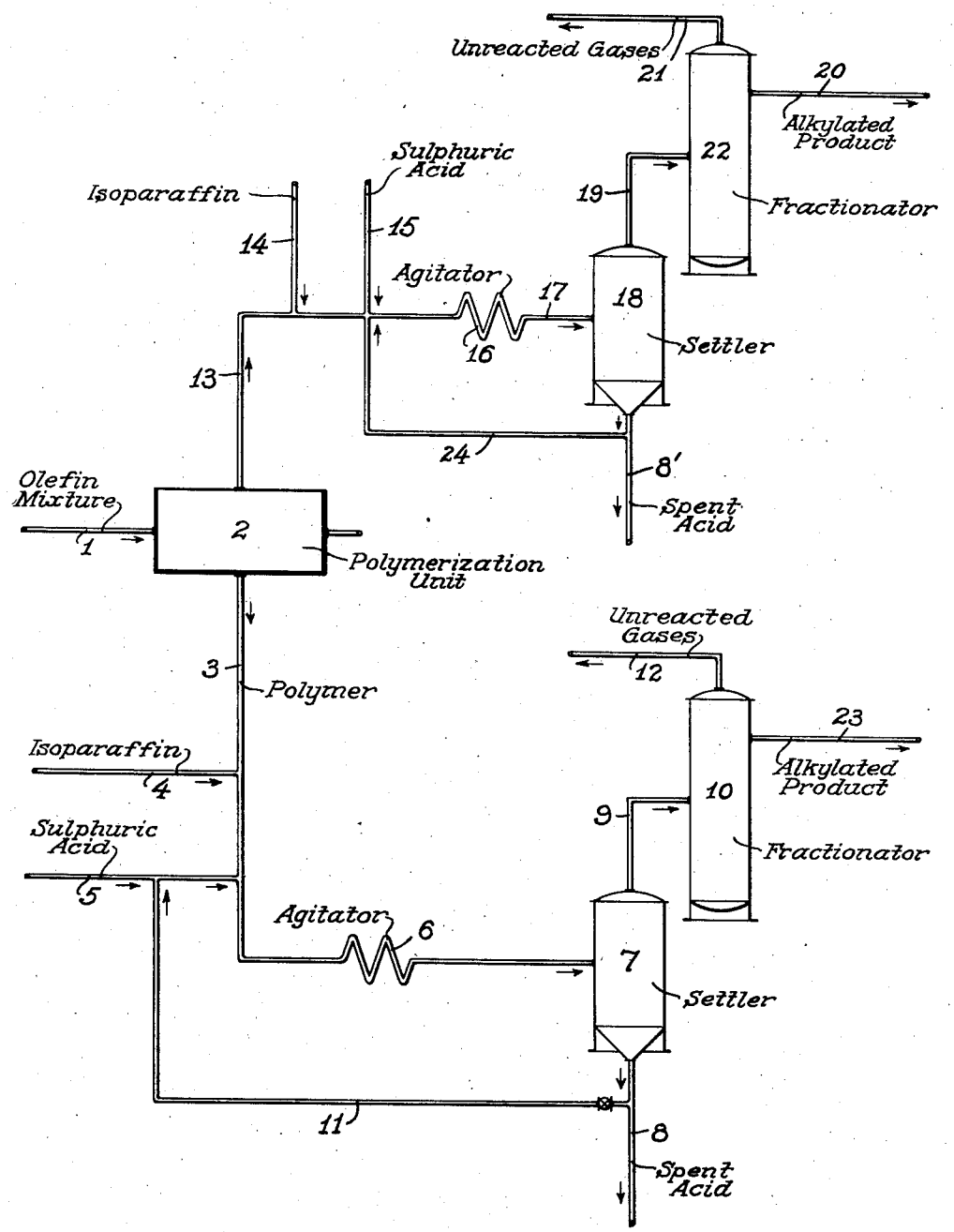
INVENTOR
Arthur L. Blount
BY Philip Subkow
ATTORNEY.

Patented Aug. 22, 1944

2,356,374

UNITED STATES PATENT OFFICE 2,356,374

ALKYLATION

Arthur L. Blount, Palos Verdes Estates, Calif., assignor to Union Oil Company of California, Los Angeles, Calif., a corporation of California Application June 20, 1939, Serial No. 280,120

6 Claims. (Cl. 260—683.4)

This invention relates to a method of producing alkylated hydrocarbons from olefins and isoparaffins by contact with an alkylating catalyst, such as chlorsulphonic acid, sulphuric acid, aluminum chloride or borontrifluoride.

Olefins react with isoparaffins in the presence of suitable catalysts and under controlled conditions of temperature to form saturated side chain paraffins.

Maximum yields of alkylated side chain paraffins are obtained by reacting individual olefins with isoparaffins with the catalyst within a definite temperature range. In other words, it is desirable in the process of forming alkylated side chain paraffins from olefins and isoparaffins to first fractionate the olefins into cuts of narrower molecular weight consisting mainly of individual olefins and then reacting these narrow cuts of olefins with isoparaffins within temperature ranges which will yield maximum quantities of alkylated side chain isoparaffins.

The methods of fractionation which I may employ in my process for the separation of olefins into individual members or fractions of narrow molecular weight may consist in selective polymerization by means of chemicals, such as strong mineral acids as, for example, concentrated sulphuric acid or phosphoric acid or certain salts, such as metallic halides as, for example, aluminum chloride or ferric chloride or by pyrolysis.

In my process I subject a mixture of olefins to a polymerization process wherein at least one of the olefin members of the mixture is converted into polymer and the other member remains unchanged. The polymerized olefin is separated from the unpolymerized olefin and each of the olefins is then separately mixed with an isoparaffin and contacted with an alkylating catalyst, such as sulphuric acid.

By alkylating the individual olefins with isoparaffins separately and then blending the alkylated hydrocarbons a greater yield of alkylated hydrocarbons is obtained than can be obtained by alkylation of the mixed olefins of differing molecular weight with isoparaffins.

Furthermore, each olefin has an optimum temperature range within which it reacts with isoparaffins to form alkylated hydrocarbons, therefore, separate alkylation of the individual olefins is desirable.

The invention may therefore be stated as residing in subjecting a mixture of olefins of differing molecular weights to selective polymerization whereby this olefin mixture is fractionally separated into olefins of narrow molecular weight, separating the polymerized olefin from the unpolymerized olefins, separately contacting the polymerized olefins and unpolymerized olefins with isoparaffins with sulphuric acid to produce alkylated hydrocarbons and then blending the alkylated hydrocarbons produced.

It is, therefore, an object of the present invention to subject an olefin mixture to selective polymerization whereby at least one of the olefins in the mixture is polymerized to separate the polymerized olefin from the unpolymerized olefin and then separately mix the polymerized olefin and the unpolymerized olefin with isoparaffin and contact each of these mixtures with an alkylating catalyst, such as sulphuric acid for the production of saturated side chain isoparaffins.

If reference is made to the drawing, olefin stock, which may comprise a mixture of butylene and propylene, is admitted into the polymerization unit 2, through line 1. In this unit the mixture of propylene and butylene is contacted with sulphuric acid of approximately 70% strength. This contact causes the butylene to form butylene polymers which are withdrawn from polymerization unit 2 through line 3. Most of the propylene admitted into unit 2 is unaffected by the sulphuric acid and is removed from unit 2 through line 13.

The polymerized butylene from unit 2, withdrawn through line 3, is mixed with an isoparaffin, such as isobutane, through line 4 and this mixture is then mixed with concentrated sulphuric acid through line 5.

The mixture of polymerized butylene-isoparaffin and sulphuric acid is then passed to agitator 6 where these materials are thoroughly mixed and then passed to settling chamber 7. The sulphuric acid is withdrawn from settling chamber 7 through line 8 and may be used again by reintroduction through lines 11 and 5, providing its strength has not been lowered below the point at which efficient alkylation takes place. The alkylated products and unreacted gases in settling chamber 7 are withdrawn through line 9 and introduced into fractionator 10. In fractionator 10 the unreacted gases are separated from the alkylated products and withdrawn through line 12. These gases consist mainly of isoparaffins and may be returned through line 4. The alkylated products, which consist chiefly of saturated side chain paraffins, are removed from fractionator 10 through line 23.

The strength of the acid employed to react the isoparaffins with the polymerized olefins in agitator 6 is preferably from 90% to 98% sulphuric acid. In order to clarify this point it will be understood that the reaction between the olefin and the isoparaffin in agitator 6 may be initially started by the introduction of sulphuric acid into line 5 having an H2SO4 content between 98 and 100%, and this acid may be continuously separated from the hydrocarbons in settler 7 and returned for reuse by introduction into line 5. The acid employed in carrying out the reaction in agitators 6 and 16 gradually loses its strength as the reaction proceeds. As the strength of the acid decreases it gradually loses its ability to catalyze the reaction between the olefin and the isoparaffin to produce the alkylated hydrocarbons. As the acid decreases in strength it increases in volume due to solution of a portion of the hydrocarbons. When the acid phase reaches an apparent H2SO4 content of 80% it no longer is of any value as an alkylating catalyst and should then either be discarded from the system or fortified with sulphuric acid of higher concentration.

It is, therefore, an object of the present invention to react olefins and isoparaffins in the presence of sulphuric acid having an initial strength or H2SO4 content of between 90 and 100% H2SO4 and to continue the introduction of further quantities of olefins and isoparaffins into said acid until the acid phase has an apparent H2SO4 content of 80% H2SO4. In other words, one modification of the invention resides in continuously employing sulphuric acid having an initial H2SO4 content of between 90 and 100%, as the catalyst to alkylate isoparaffins with olefins until the sulphuric acid phase contains an apparent H2SO4 content of 80% and then to discontinue the introduction of olefin and isoparaffin into the acid. The invention also resides in fortifying the partially spent acid with acid having an H2SO4 content between 90 and 100% and preferably 98.3%.

While I have described a process in which sulphuric acid is employed which has an initial H2SO4 content between 90 and 100% and the continued use of this catalyst has an apparent H2SO4 content of 80%, I prefer to start with acid having an H2SO4 content of about 98.3% and continue its use until it has an apparent H2SO4 content of 94 to 96% since this is the most efficient range. When the acid has reached an apparent H2SO4 concentration of 94 to 96%, it may then be fortified with stronger sulphuric acid to increase its catalyzing activity.

The best temperature range for contacting polymerized butylene with isoparaffin, such as isobutane, in agitator 6 is in the order of 30° F. to 60° F. Furthermore, I have found that it is desirable to blend the polymerized olefin with isoparaffin prior to contact with sulphuric acid in the ratio of one mol of the polymerized olefin to at least ten mols of isoparaffin.

The olefins which are not polymerized in unit 2 are withdrawn through line 13 and are mixed with isoparaffin, such as isobutane introduced through line 14, and this mixture is then mixed with concentrated sulphuric acid introduced through line 15. The mixture of olefin, isoparaffin and sulphuric acid is then passed to agitator 16 which insures thorough mixture between these three materials. This mixture then passes via line 17 to settler 18 where the sulphuric acid is separated from the alkylated product and unreacted hydrocarbons. The acid in the bottom of settler 18 may be returned through line 24 or withdrawn through line 8'. The alkylated product mixed with unreacted gases is withdrawn through line 19 and passed to fractionator 22 where the products of alkylation are separately recovered via line 20 and the unreacted gases separately recovered via line 21.

I prefer to employ sulphuric acid having an actual H2SO4 concentration of from 94% to 100%. However, I may employ the sulphuric acid until the apparent H2SO4 concentration of the acid phase in the system is in the order of 80.0%. By apparent concentration I mean the H2SO4 concentration of the acid phase as calculated on a weight basis. The sulphuric acid present in this phase is actually about 92% H2SO4 concentration but owing to the presence of hydrocarbons it has an apparent H2SO4 content of 80%.

Where the gaseous olefins recovered from the polymerization unit 2 consist mainly of unpolymerized propylene, I have found that the temperature employed in agitator 16 for contacting the sulphuric acid, isoparaffin and the propylene should be in the order of 70° F. to 100° F. and, preferably, at 80° F. Furthermore, I have found that the ratio of isoparaffin to olefin in agitator 16 should be in the order of ten parts of isoparaffin to one part of the olefin.

While the above flow sheet describes the use of sulphuric acid as the polymerization agent in unit 2, it is to be understood that I do not wish to limit myself to this means of polymerization only, since I may also use other materials to produce the same result. For example, I may use phosphoric acid in unit 2 as the polymerization agent or metallic halide, such as aluminum chloride or ferric chloride or, if desired, unit 2 may comprise a pyrolytic polymerization unit.

Furthermore, it is to be understood that the olefin mixture introduced through line 1 into unit 2 may be composed of any number of olefins as, for example, it may comprise a mixture of ethylene, propylene and butylene. This mixture may then be treated in unit 2 in such a manner as to polymerize only the butylene and this polymer may then be alkylated in accordance with the above description. The unreacted mixture of ethylene and propylene may then be passed to a second polymerization chamber, not shown, for the polymerization of the propylene. The polymerized propylene may then be passed to an alkylation unit similar to the one described above for the alkylation of polymerized butylene wherein it may be mixed with isoparaffin and sulphuric acid, and then alkylated at a temperature in the order of 60° F. to 100° F.

The unreacted ethylene recovered in the form of a gas in the second polymerization unit may then be passed together with the isoparaffins into an agitating zone, where this mixture is mixed with sulphuric acid, and then to a separating zone for the separation of the alkylated hydrocarbons from the sulphuric acid and unreacted hydrocarbon gases.

The foregoing is not to be taken as limiting, but only descriptive of the invention coming within the scope of the following claims.

I claim:

1. A process for the production of alkylated hydrocarbons from a mixture of normally gaseous olefin hydrocarbons having different molecular weights which comprises subjecting said mixture of olefin hydrocarbons to conditions of polymerization adapted to polymerize substantially all of the olefin hydrocarbons of one molecular weight contained in said mixture without substantially polymerizing the olefin hydrocarbons of a different molecular weight and thereby selectively polymerizing said olefin hydrocarbons of said one molecular weight, separating said polymerized olefin hydrocarbons from the unpolymerized olefin hydrocarbons and separately alkylating said polymerized and unpolymerized olefin hydrocarbons with an isoparaffin in the presence of an alkylating catalyst at different optimum temperatures adapted to produce the greatest yield of alkylated hydrocarbons from said polymerized and unpolymerized olefin hydrocarbons.

2. A process for the production of alkylated hydrocarbons from a mixture of propylene and butylene which comprises subjecting said mixture of propylene and butylene to conditions of polymerization adapted to polymerize substantially all of the butylene contained in said mixture without substantially polymerizing said propylene and thereby selectively polymerizing said butylene, separating substantially all of the polymerized butylene from the propylene and thereby producing a propylene fraction substantially free from butylene and separately alkylating said separated propylene and polymerized butylene with an isoparaffin in the presence of an alkylating catalyst at different optimum temperatures adapted to produce the greatest yields of alkylated hydrocarbons from said propylene and polymerized butylene.

3. A process for the production of alkylated hydrocarbons from a mixture of propylene and butylene which comprises subjecting said mixture of propylene and butylene to conditions of polymerization adapted to polymerize substantially all of the butylene contained in said mixture without substantially polymerizing said propylene and thereby selectively polymerizing said butylene, separating substantially all of the polymerized butylene from the propylene and thereby producing a propylene fraction substantially free from butylene and separately alkylating said separated propylene and polymerized butylene with an isoparaffin in the presence of an alkylating catalyst at different temperatures, thereby obtaining a greater yield of alkylated hydrocarbons than is obtainable by alkylating the mixture of propylene and butylene with an isoparaffin in the presence of said alkylating catalyst.

4. A process for the production of alkylated hydrocarbons from a mixture of normally gaseous olefin hydrocarbons having different molecular weights which comprises subjecting said mixture of olefin hydrocarbons to conditions of polymerization adapted to polymerize substantially all of the olefin hydrocarbons of one molecular weight contained in said mixture without substantially polymerizing the olefin hydrocarbons of a different molecular weight and thereby selectively polymerizing said olefin hydrocarbons of said one molecular weight, separating said polymerized olefin hydrocarbons from the unpolymerized olefin hydrocarbons and separately alkylating said polymerized and unpolymerized olefin hydrocarbons with an isoparaffin in the presence of an alkylating catalyst at optimum temperatures adapted to produce the greatest yield of alkylated hydrocarbons from said polymerized and unpolymerized olefin hydrocarbons said optimum temperature being higher for the said unpolymerized olefin hydrocarbons than the optimum temperature for the said polymerized olefin hydrocarbon.

5. A process for the production of alkylated hydrocarbons from a mixture of propylene and butylene which comprises subjecting said mixture of propylene and butylene to conditions of polymerization adapted to polymerize substantially all of the butylene contained in said mixture without substantially polymerizing said propylene and thereby selectively polymerizing said butylene, separating substantially all of the polymerized butylene from the propylene and thereby producing a propylene fraction substantially free from butylene and separately alkylating said separated propylene and polymerized butylene with an isoparaffin in the presence of an alkylating catalyst at different optimum temperatures adapted to produce the greatest yields of alkylated hydrocarbons from said propylene and polymerized butylene said optimum temperature for the alkylation of the said polymerized butylene being within the range of 30° F. to 60° F., and said optimum temperature for the alkylation of the said unpolymerized propylene being higher than that employed for said alkylation of polymerized butylene.

6. A process for the production of alkylated hydrocarbons from a mixture of propylene and butylene which comprises subjecting said mixture of propylene and butylene to conditions of polymerization adapted to polymerize substantially all of the butylene contained in said mixture without substantially polymerizing said propylene and thereby selectively polymerizing said butylene, separating substantially all of the polymerized butylene from the propylene and thereby producing a propylene fraction substantially free from butylene, alkylating said separated polymerized butylene with an isoparaffin in the presence of an alkylating catalyst at a temperature between 30° F. and 60° F., and separately alkylating said propylene fraction at a temperature between 70° F. and 100° F., thereby obtaining a greater yield of alkylated hydrocarbons than is obtainable by alkylating the mixture of propylene and butylene with an isoparaffin in the presence of said alkylating catalyst.

ARTHUR L. BLOUNT.